Patented June 17, 1952

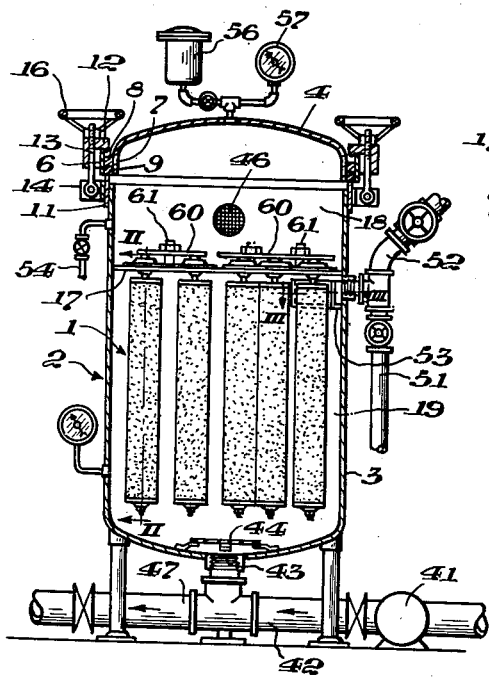

2,600,458

UNITED STATES PATENT OFFICE 2,600,458

UPFLOW PRESSURE DIATOMITE FILTERING APPARATUS

Harry A. Ackley, Sewickley, Pa., and Ralph N. Perkins, Omaha, Nebr.

Application March 25, 1950, Serial No. 151,978

4 Claims. (Cl. 210—184)

This invention relates to filter systems, and particularly to apparatus for filtering drinking water, swimming pool water and other liquids.

In recent years, diatomaceous earth or diatomite, has been used more and more frequently as the purifying medium in many types of filter systems, this earth being composed of a large number of microscopic shell-like fossils, or diatoms. Usually, apparatus employing this diatomite includes a number of filtering septa carried in a filter tank, the septa each being formed with a fine mesh, cylindrical side wall on which is deposited a coating of this diatomaceous earth, the coating being held in place by the pressure used to force the influent through the septa side walls.

There are two main groups into which filtering apparatus may be classified, one of these being apparatus which utilizes vacuum pressure to draw influent through the filtering coating, and the other being apparatus in which a pressure pump forces the influent to pass through the coating. The improvements contemplated by this invention are concerned principally with the latter group and, more specifically, with apparatus in which influent is forced into the bottom of the tank and discharged from the top; this type of apparatus being known as an up-flow pressure diatomite filter.

The use of diatomaceous earth is advantageous because of its unusual ability to remove dirt, oils, slime and other foreign substances from the influent, and also because of the ease by which the influent can pass through this coating, as well as the ability of the diatomaceous coating to resist clogging for unusually long periods of time. However, it is obvious that after a certain period of use any filter cake, or coating, will clog, so that it becomes uneconomical to attempt to force the liquid and consequently, necessary to wash the coating from the wire mesh walls of the septa and apply a new one. One of the difficulties of pressure upflow diatomite filters has been to provide a thoroughly efficient manner of washing the septa because the liquid to be filtered enters the bottom of the tank and picks up whatever spent and slimy coating that has not been flushed from the tank. Such re-using of spent diatomite will reduce the length of time during which the apparatus may be operated before it again becomes clogged and eventually may form a hard coating on the wire-mesh septa walls which permanently seals off the filter passage. Also, it can be appreciated that any slime remaining on the septa screens increases the pressure necessary to force the filtrate flow, and this, of course, increases the costs of operation. The conventional way of washing septa is by back-washing, i. e., by effecting a reverse flow of the filtrate, but, such a method is relatively uneconomical because a large volume of water is necessary for effective cleaning, and this water is wasted. Further, it is a fact that the more efficient the type of septum screen used, the more water is necessary to effectively wash it. Such back-washing further requires unnecessary pipes, fittings and valves which increase the initial cost of the filtering equipment. Some attempts have been made to avoid the disadvantages of back-washing by forcing compressed air through the filter septa, but, so far as we are aware, air washes for up-flow pressure filters have not performed the job efficiently.

It is therefore an object of this invention to provide up-flow pressure diatomite filtering apparatus in which the filter septa can be quickly, economically and thoroughly washed.

A more specific object is to provide apparatus for effectively air-washing the filter septa of an up-flow diatomite filter.

According to the invention, the apparatus includes a filter tank which is divided into an upper and lower chamber by a partition plate, and the filter septa, preferably, are mounted in this plate. The major portions of the septa extend downwardly in the lower chamber and are provided with porous side walls on which is formed a coating of diatomaceous earth. Also, a valve-controlled exhaust conduit is connected into the lower chamber at its upper portion and at a spaced distance below the partition wall. Prior to a washing operation, this exhaust conduit is opened to drain the fluid in the tank to the level of the opening into the conduit, and it will be noted that when the tank is so drained, there will be an air space between the fluid in the tank and the partition plate. The upper chamber of the tank is placed in communication with a source of compressed air, the air conduit for this source being provided with suitable quick acting valves.

To air wash the septa, the fluid in the tank first is drained to the level of the exhaust conduit and then, after closing the valve on that conduit, the valve on the compressed air conduit is opened to pressurize the interior of the tank. With the tank so pressurized, the exhaust conduit then is opened quickly, with the result that the air between the partition plate and the level of the fluid is evacuated and the air above the partition plate immediately jumps from above the plate to the reduced pressure area below the plate so as to equalize the pressure within the tank. In this invention, the travel of the air in so jumping is controlled so as to be directed to the interior and to the bottom of each filter septum, and for this purpose each septum carries interiorly of it a perforated air header which extends from the upper chamber to the bottom of the septum. The air jumping from the upper to the lower chambers then is constrained to flow through the air header and rush outwardly through the septa side walls with a considerable force which churns the fluid so violently that any foreign particles which are stuck to the surface of the septa are very quickly loosened; this rapid rush of air being termed an "air-bump." It has been found that a ten second-air wash is more effective than a ten minute-water wash insofar as cleaning filter septa is concerned. After the air wash, the fluid in the tank may be completely evacuated through an opening provided in the bottom of the tank, and then a small quantity of water used in a particular manner to be described to rinse the septa and the tank.

The preferred embodiment of the invention is illustrated in the accompanying drawings, of which Fig. 1 is a vertical section through a filter tank, and Figs. 2 and 3 sections taken along lines II—II and III—III, respectively, of Fig. 1.

Referring to Fig. 1, filter septa 1 are mounted in an upright tank 2 which is formed of a lower body portion 3 and a separable head 4, this head being separable so as to permit its removal when it is desired to lift out the septa for repair or replacement. One of the disadvantages of prior filter tank construction has been that the tank heads were bolted to the body portion, and, the bolts soon rusted-on, so that the task of removing the heads became so difficult that operators were inclined to avoid the inspections necessary for proper maintenance.

In the present construction, removal of the tank heads is greatly facilitated by utilizing clamping mechanisms to hold the heads to the body portion. Two of these clamping mechanisms are shown in Fig. 1, although it will be understood that any number of these may be used at spaced positions around the tank. As shown, the clamping action is achieved by forming the head with a heavy steel ring 6 that is connected to downwardly extending flange 7 of the head by being welded to a spacing ring 8. Below ring 8 is carried a gasket 9 formed of rubber, or other suitable sealing material. Another steel ring 11 is welded to the peripheral upper edge of tank body portion 3, this ring pressing against gasket 9 when the head is clamped onto the body. The clamping action is provided by clamping plate 12 mounted on eye-bolt 13 that is pivotally carried on an eye-bolt supporting member 14 secured to steel ring 11. The eye-bolt mounts a handwheel 16 which bears against clamping plate 12 so as to press the head of the tank against the bottom ring 11. It will be recognized that the head can be very simply removed by manipulating the handwheel so as to disengage the clamps, the clamps then being swung downwardly out of the way.

Interiorly of tank 2 is mounted a partition plate 17 provided with a number of openings in which the filter septa are mounted, this partition plate dividing the tank into an upper chamber 18 and a lower chamber 19. The construction of the septa is shown in Fig. 2 and, as there seen, each of the septa includes a septum head 21 formed with a downwardly facing annular flange 22, and a suitable gasket 23 is carried on this flange so as to seal off any flow from the lower chamber into the upper chamber around the septum head 21. The portion of the septum lying in the bottom of chamber 19 of the tank is formed of upper and lower closure plates 26 and 27 between which is carried a cylindrical wire mesh septum side wall 28, this side wall having a sealing engagement with the closure plates so that influent is constrained to flow from the tank radially inwardly through the wire mesh. Also, a coating 29 of diatomaceous earth is formed on the side walls, this coating being the filtering, or purifying, medium. To secure septum head 21 to upper closure plate 26, the upper plate is formed with an upwardly projecting tubular wall 31 that is telescoped in and secured to a downwardly projecting cylindrical projection 32 formed integrally with septum head 21. For reasons which will be explained, cylindrical wall 31 of upper closure plate 26 is of such a length that side wall 28 of each septum is carried a spaced distance below partition plate 17 of the tank. Also, upper closure plate 26 and septum head 21 each is formed with openings 30 and 35 for permitting effluent flow from the interior of the septa upwardly through tubular member 31 and out through the head into upper chamber 18 of the tank.

Another important feature of this invention is that each of the septa carries interiorly of it a perforated air header 33 that is placed in communication with upper chamber 18 of the tank by an air inlet tube 34, air header 33 extending axially through each of the septa and being supported by upper and lower closure plates 26 and 27. Air inlet tube 34 is open at its upper end and has its lower end telescoped into and, preferably, threadably connected to air header 33, while slidably mounted on the upper end of the air tube is a flap, or choke, valve 36 which seats interiorly of septum head 21 in the manner shown in Fig. 2. The operation of this valve will be explained later, but, generally, its principal function is to form a seal that prevents air in the upper chamber from flowing directly into the interior of the septa through openings 35 in the septa heads, tubular member 31 and openings 30 in upper closure plate 26. In other words, this valve, when seated, prevents any air in the upper chamber from flowing into the filter septa except in a path that is downwardly through air inlet tube 34 and perforated air header 33.

In a filtering run, the flow is along the path normally followed in pressure up-flow filters. Specifically, a pump 41 (Fig. 1) is used to force influent through a valve-controlled conduit 42 and then through an influent opening 43 formed in the bottom of the tank. As the influent enters the tank, it is distributed by a baffle 44 and then the pressure of the pump forces the influent through the side walls of the septa, the pressure being sufficient to slide choke valve 36 upwardly on air inlet tube 34 into an open position and to hold this open position so that the influent which has been forced through the septa side walls can rise through openings 30 and tube 31 and pass beneath the valve into septa head 21, from which it escapes through openings 35 into upper chamber 18 and on to an effluent discharge opening 46 and finally into a conduit which leads the fluid back to a swimming pool, or whatever its place of use may be. Also, the tank can be emptied through influent opening 43 by shutting down the pump, closing the valve of conduit 42 and then opening the valve on a discharge conduit 47. When the tank is being evacuated in this manner, valves 36, of course, immediately close, but most of the effluent in upper chamber 18 escapes or drains out through tubular air inlet conduits 34 and perforated, tubular air headers 33 into the interior of the septa from which it passes into the lower chamber by seeping outwardly through the porous septa walls. It will be readily appreciated that the effluent in the upper chamber can drain only to the upper levels of air inlet tubes 34, but this is sufficient because the draining of that amount leaves an air space in the upper chamber which, in the manner and for the purpose to be explained, can be subjected to air pressure that is used to clean the wire mesh side walls of the septa. Of course, the fluid in the lower chamber can be drained down to any level desired, and, eventually it is entirely drained out to permit a rinsing of the septa by wash water, this rinsing and the apparatus for accomplishing it also forming a part of this invention which will be described later.

As has been mentioned, one of the principal features of the invention is the provision of means for thoroughly scavenging the wire mesh side walls of the septa of any slime, dirt, or other foreign particles, and as indicated above this scavenging is performed first by an air wash and then by a special water rinse. The apparatus for accomplishing the scavenging includes, in addition to the air lines and flap valves already described, the placing of bottom chamber 19 of the filter tank in communication with an exhaust conduit 51, this conduit opening into the tank a spaced distance below partition plate 17. As may be noted, conduit 51 opens into the tank at approximately the same level as the upper ends of wire mesh side walls 28 of the filter septa. Also, a washwater conduit 52 is connected by a T-joint to conduit 51 so that it also is placed in communication with the interior of the tank, and both conduits 52 and 51 are provided with quick acting valves for selectively controlling the flow through one or the other. For purposes to be described, it may also be noted that a trough-shaped baffle wall 53 is carried interiorly of the tank, this baffle wall extending for approximately forty-five degrees around the interior of the tank on either side of the opening of conduits 51 and 52 into the tank.

The air for the air washing is supplied through a valve-controlled compressed air conduit 54 connected into upper chamber 18 of the tank, the air being supplied by a small air compressor (not shown). Also connected into the upper chamber of the tank is a valve-controlled automatic air vent 56 and a suitable pressure gauge 57.

With this arrangement of elements, when the filter septa become so clogged that excessive and uneconomical pump pressure is required to force influent through the septa coatings, the septa side walls may be washed in a manner now to be described. To commence the wash, pump 41 first is shut down and then it is made certain that the valves of inlet and outlet conduits 47 also are closed. With compressed air conduit 54 closed off, and with automatic air vent 56 open, the valve of exhaust conduit 51 is opened to permit the liquid contents of the tank to drain from upper chamber 18 through air inlet tubes 34, air headers 35, the septa side walls and out of lower chamber 19 to the level of the lip of baffle wall 53. When the liquid has drained to this level, the valve of exhaust conduit 51 is closed and automatic air vent 56 also is closed. The situation at this point is such that there is liquid covering substantially the full area of the side walls of the filter septa, and, that, between the tops of these side walls and partition plate 17 is an air space. It, further, may be noted that all of the liquid and air exhaust conduits are closed.

Such being the conditions, the contents of the tank are pressurized by admitting compressed air into upper chamber 18 through compressed air conduit 54. It will be recalled that there is an air space between the top of the filter septa and partition plate 17, and the compressed air admitted to the upper chamber must find its way to this space, so as to equalize pressures within the tank. The only possible path for the air to reach this air space is by flowing through air inlets 34 and air headers 33, and then outwardly through the perforations of the air headers and side walls 28 of the filter septa. During the passage of the air through the side walls, a considerable amount of the foreign matter on the side walls is loosened and drops away from them. Thorough scavenging, however, is accomplished by quickly opening the valve of exhaust conduit 51 which suddenly reduces the pressure in the air space below partition wall 17. The air in upper chamber 18, being under high pressure, then suddenly rushes downwardly through air inlet lines 34 and air headers 33 to equalize the pressure within the tank. This sudden jump of air rushes outwardly through the filter septa with considerable force and, in forcing its way into the air space below partition wall 17, churns the fluid around the filter septa to such an extent that all particles of foreign matter are loosened and dropped away from the wire mesh side walls of the septa. Also, it should be noted that the perforations of air headers 33 are provided at its bottom portions, as well as its middle and upper portions, so that the rush of air is directed radially out through the full length of the side walls to clean all portions of these walls. It has been found that air is much more effective in dislodging the filtrate and the sediment from the side walls than is a back-washing by the filtrate, and, as a matter of fact, a ten second air wash is more effective than a ten minute water wash.

After this air wash has been completed, the tank is completely drained of all of the liquid by opening the valve on outlet conduit 47. Following that, exhaust conduit 51 is closed and wash water conduit 52 opened to admit septa and tank rinsing water into the tank. Experience has shown that a rinse of water on the outside of the filter has a far better cleaning power than one applied on the inside and, for this reason, baffle wall 53 is so formed and positioned that the rinse water is directed out over the bottom surface of partition plate 17 from which it flows down over the outside surface of all of the filter septa. Baffle plate 53 acts to convert the inflow of the rinse water into a fan-shaped spray which reaches all of these described surfaces.

By the combined use of the air-pump already described and the fan-shaped spray of rinse water, a thorough cleaning of the septa is accomplished, and it should be noted, that the only water which has been wasted is the relatively small amount of rinse water used, as well as the filtrate which was in the tank and the upper pipes when pump 41 initially was shut down. Consequently, it will be appreciated that this described manner of washing filter septa is far more economical than the previously used back-wash. Further, the air compressor necessary for this air wash does not add any substantial cost since a small air compressor outfit may be used; an air storage tank of four or five cubic feet capacity being sufficiently large for a filter plant of from 500 to 600 gallons.

The invention described above is concerned primarily with the washing of the filter septa, and for that reason, no attempt has been made to show the conventional pre-coating pot, as well as the usual slurry feeder, pressure gauges, clean-out hole, and other equipment normally associated with such filtering apparatus. The construction and operation of such equipment is well known, and we believe, needs no description. However, it should be stated that the description has been of a single filter unit, and that, in actual practice, any desired number of these units may be used.

One additional structural feature of the invention is that the filter septa are mounted in a manner which improves the air-washing, as well as facilitates removal of the septa for cleaning or replacement. As stated earlier, the septa are mounted in partition wall 17, and as may be noted in Fig. 1, the septa are nested together in groups, each group being held down in sealed engagement with partition wall 17 by a pressure plate 60 and a stud bolt 61. The nesting together of the filter septa is advantageous in washing because the rush of water during the air-bump moves through the wall of each of the septa of the group and strikes the exterior wall of another septa of the group. Also, when the septa are to be removed, head 4 of the tank may be quickly unclamped and then stud bolt 61 and pressure plate 60 easily disengaged to permit each septum to be lifted out independently. Consequently, it is a simple job to make regular inspections of the septa and tank and, when the filtering apparatus is not in use, the tank may be easily opened up and dried out.

Other advantages should be readily apparent to those skilled in the art, and they include lightness of construction, the use of standard, readily-available parts, as well as a compact structural arrangement which saves much needed space.

According to the provisions of the patent statutes, we have explained the principle, preferred embodiment and mode of operation of our invention, and have illustrated and described what is now considered to represent its best embodiment. However, we desire to have it understood that, within the scope of the appended claims, the invention may be practiced otherwise than as specifically illustrated and described.

We claim:

1. Filtering apparatus comprising a filter tank, a partition plate dividing the tank into an upper chamber provided with an effluent discharge opening and a lower chamber having an influent inlet opening, filter septa extending from said upper chamber through said plate and into said lower chamber, said septa each having a perforated head portion opening into said upper chamber, a body portion lying in the lower chamber and a conduit connecting said head to said body portion, said body portions each being formed with a porous side wall adapted to receive a coating of diatomaceous earth, pressure means for forcing influent in said lower chamber inwardly through each septum upwardly through said conduit and outwardly through said perforated head and said discharge opening, a normally-closed valve mounted in each septum for shutting off flow through said conduit from the upper into the lower chamber, said valve being opened by said pressure for the flow of liquid from the lower into the upper chamber, a perforated air conduit extending interiorly of each septum from said body portion into said head, the upper end of said last-mentioned conduit being in open communication with the effluent in the upper chamber, a valve-controlled exhaust conduit connected into a side of said lower chamber a spaced distance below said partition plate for draining the lower chamber substantially to that level, a portion of the effluent in the upper chamber also draining out through said exhaust conduit by flowing through said perforated air conduit and said porous septa side walls into said lower chamber, and compressed air mechanism connected into said upper chamber and communicating with said lower chamber through said perforated air conduit for air washing said septa side walls substantially as described.

2. Filtering apparatus comprising a filter tank, a partition plate dividing the tank into an upper chamber provided with an effluent discharge opening and a lower chamber having an influent inlet opening, filter septa extending from said upper chamber through said filter plate and into said lower chamber, said septa each having a perforated head portion lying in said upper chamber, a body portion lying in the lower chamber, and a conduit connecting said head to said body portion, said body portions each being formed of upper and lower closure plates and a porous side wall, the side walls being adapted to receive a coating of diatomaceous earth, pressure means for forcing influent in said lower chamber inwardly through each septum upwardly through said conduit and outwardly through said perforated head and said discharge opening, each upper end closure plate being apertured to permit flow into said conduits and each being carried in said lower chamber a spaced distance below said partition plate, a normally-closed valve mounted in each septum for shutting off flow of liquid through said conduit from the upper into the lower chamber, said valve being opened by said pressure for the flow of liquid from the lower into the upper chamber, a perforated air conduit extending interiorly of each septum from said body portion into said head, the upper end of said air conduit being in open communication with the effluent in the upper chamber, a valve-controlled exhaust conduit connected into a side of said lower chamber at approximately the same distance below said partition wall as said upper end closure plate for draining the lower chamber substantially to that level, a portion of the effluent in the upper chamber also draining out through said exhaust conduit by flowing through said perforated air conduit and said porous septa side walls into said lower chamber, and compressed air mechanism connected into said upper chamber and communicating with said lower chamber through said perforated air conduit for air washing said septa side walls substantially as described.

3. Filtering apparatus comprising a filter tank, a partition plate dividing the tank into an upper chamber provided with an effluent discharge opening and a lower chamber having an influent inlet opening, filter septa extending from said upper chamber through said plate and into said lower chamber, said septa each having a perforated head portion lying in said upper chamber, a body portion lying in the lower chamber and a conduit connecting said head to said body portion, said body portions each being formed with a porous side wall adapted to receive a coating of diatomaceous earth, pressure means for forcing influent in said lower chamber inwardly through each septum upwardly through said conduit and outwardly through said perforated head and said discharge opening, a normally-closed valve mounted in each septum for shutting off flow of liquid through said conduit from the upper into the lower chamber, said valve being opened by said pressure for the flow of liquid from the lower into the upper chamber, a perforated air conduit extending interiorly of each septum from its lower portion into said head, the upper end of said air conduit being in open communication with the effluent in the upper chamber, a valve-controlled exhaust conduit connected into a side of said lower chamber a spaced distance below said partition plate for draining the lower chamber substantially to that level, a portion of the effluent in the upper chamber also draining out through said exhaust conduit by flowing through said perforated air conduit, and said porous septa side walls into said lower chamber, a valve-controlled wash water conduit connected into said lower chamber at approximately the level of said exhaust conduit, and compressed air mechanism connected into said upper chamber and communicating with said lower chamber through said perforated air conduit, whereby said septa side walls may be air washed by draining to said level, said tank carrying a baffle wall disposed between said wash water conduit inlet and said septa side walls, and said baffle being adapted to direct a spray over the septa walls.

4. Filtering apparatus comprising a filter tank, a partition plate dividing the tank into an upper chamber provided with an effluent discharge opening and a lower chamber having an influent inlet opening, filter septa extending from said upper chamber through said plate and into said lower chamber, said septa each having a body portion lying in said lower chamber and formed of a porous wall adapted to retain a coating of diatomaceous earth and a conduit placing the upper end of said body portion in open communication with said upper chamber, pressure means for forcing influent in said lower chamber inwardly through said septa side walls and through said septa conduits into said upper chamber whereby the influent is filtered, valve means adapted to prevent return flow of liquid from said upper into the lower chamber, said valve means opening in response to said pressure for flow of liquid into the upper chamber, said filter septa being so carried within said tank that the top ends of their porous side walls lie a spaced distance below said partition plate, a valve-controlled wash water conduit opening into a side of said lower chamber at approximately the level of the said septa top ends, and a baffle disposed between said wash water inlet and said septa top ends, said baffle being adapted to direct a spray of wash water against said partition plate and then over the porous walls of said septa when said lower chamber is empty.

HARRY A. ACKLEY.
RALPH N. PERKINS.

REFERENCES CITED

The following references are of record in the file of this patent:

UNITED STATES PATENTS

| Number | Name | Date |
|---|---|---|
| 272,831 | Field | Feb. 20, 1883 |
| 870,631 | Kneuper | Nov. 12, 1907 |
| 1,771,928 | Jung | July 29, 1930 |
| 1,866,970 | Garland et al. | July 12, 1932 |
| 1,992,101 | Stuart | Feb. 19, 1935 |
| 2,347,927 | Paterson et al. | May 2, 1944 |
| 2,423,172 | Booth | July 1, 1947 |
| 2,496,370 | Baily | Feb. 7, 1950 |
| 2,562,699 | Cooperson et al. | July 31, 1951 |